United States Patent [19]
Schissler et al.

[11] Patent Number: 5,973,796
[45] Date of Patent: Oct. 26, 1999

[54] SCANNER CARRIAGE MIRROR MOUNTING TO REDUCE FOOTPRINT

[75] Inventors: Dennis Schissler, San Diego; Gerold Guenter Firl, Poway, both of Calif.

[73] Assignee: Hewlett-Packard Company, Palo Alto, Calif.

[21] Appl. No.: 09/006,312

[22] Filed: Jan. 13, 1998

[51] Int. Cl.⁶ ..................................................... H04N 1/04
[52] U.S. Cl. ........................... 358/474; 358/475; 358/497
[58] Field of Search ................................... 358/471, 474, 358/475, 497, 496, 494, 400, 505, 506, 487; 250/234, 235, 216, 208.1; 382/312; 399/211, 202, 198; 355/40, 72, 74, 75; 348/96, 97, 270; 359/871, 872, 855, 857, 881, 861

[56] References Cited

U.S. PATENT DOCUMENTS

| | | | |
|---|---|---|---|
| 4,847,641 | 7/1989 | Tung | 347/13.1 |
| 5,005,139 | 4/1991 | Tung | 395/101 |
| 5,159,484 | 10/1992 | Yanagisawa | 359/224 |
| 5,239,313 | 8/1993 | Marko et al. | 347/132 |
| 5,336,878 | 8/1994 | Boyd et al. | 250/208.1 |
| 5,341,225 | 8/1994 | Stein et al. | 358/498 |
| 5,410,347 | 4/1995 | Steinle et al. | 348/270 |
| 5,463,217 | 10/1995 | Sobol et al. | 250/234 |
| 5,568,277 | 10/1996 | Hatano et al. | 358/400 |
| 5,586,212 | 12/1996 | McConica et al. | 385/146 |
| 5,687,007 | 11/1997 | Yamazaki et al. | 358/474 |

*Primary Examiner*—Edward L. Coles
*Assistant Examiner*—Cheukfan Lee
*Attorney, Agent, or Firm*—Jerry R. Potts

[57] ABSTRACT

A document scanner carriage housing contains a pair of spaced mirrors whose spacing and parallelism is precisely maintained by floating metal spacer plates which are not affixed to the housing. Spaced springs urge one of the mirrors into engagement with the spacer plates, the other mirror being referenced to the molded plastic housing. The parallel facing image plane sides of the mirrors are substantially unobstructed by the spacer plates which contact them thus allowing the scanner to efficiently use a substantial proportion of the image planes of the mirrors and occupy a comparatively small footprint. The floating spacer plates and mirrors are cushioned against shock and vibration by compressed elastomeric pads on the underside of the housing cover which allows the spacing and parallelism of the mirrors to be maintained without direct affixation of the mirrors or spacer plates to the housing.

30 Claims, 3 Drawing Sheets

SCANNER CARRIAGE MIRROR MOUNTING TO REDUCE FOOTPRINT

CROSS REFERENCE TO RELATED APPLICATIONS, IF ANY

None

BACKGROUND OF THE INVENTION AND PRIOR ART

The present invention relates generally to document scanners and, more specifically, to the mounting of spaced parallel mirrors therein to maintain precise spacing and parallelism of the mirrors while reducing the physical size of the scanner carriage.

Document scanners ordinarily employ a molded plastic housing in which the mirrors are positioned by referencing them directly to different parts of the plastic chassis, requiring the plastic chassis or housing to hold the tolerance. As is well known, it is difficult to hold a tight tolerance on an injection molded plastic chassis, especially under varying thermal conditions of use. Some past solutions have achieved the required tolerance by referencing the mirrors to each other through sheet metal plates, one on each end of the mirror. These plates are screwed onto the plastic chassis, and spring clips bias the mirrors to either end of the sheet metal plates. The plates also have bends which make the positional tolerances more difficult to achieve.

The mirrors in a scanner carriage housing must also maintain their exact parallel position and spacing despite any shocks during shipment or vibration during use which might be experienced. A very small translation or rotation in any of the mirrors may cause the scanner to lose its alignment. Accordingly, the mirrors must be tightly constrained to prevent such misalignment.

In the past, scanner mirrors have typically been biased and constrained to their datums by use of sheet metal spring clips pressing on the image plane side of the mirror. These clips require mirrors of extra length since a non-imaged surface of the mirror is occupied by the sheet metal spring clips.

OBJECTS OF THE INVENTION

It is accordingly an object of the invention to provide a more reliable mounting of spaced mirrors in a scanner carriage wherein the mirrors must maintain precise spacing and parallelism with minimal image plane areas occupied by parts which contact the facing image plane sides of the mirrors.

It is a further object of the invention to provide precise positioning of spaced parallel mirrors in a scanner carriage wherein the mirrors are referenced to each other by metal spacer plates whereby tight tolerances in the mirror positioning can be maintained despite thermal variations during use of the scanner.

It is a further object of the invention to provide a scanner carriage with spaced parallel mirrors in which the mirror spacing is defined by metal spacer plates without mechanical affixation of the spacer plates to the carriage housing.

It is a further object of the invention to provide a scanner carriage in which spaced mirrors to be maintained in precise parallel relationship are held in position relative to each other by spaced metal plates which are resiliently constrained in the carriage housing without the necessity of fastening screws or the equivalent.

SUMMARY OF THE INVENTION

The present invention accordingly provides, in a scanner carriage comprising a housing containing a plurality of mirrors which provide a folded optical light path for transmitting a scanned image to a lens assembly, the improvement comprising spaced first and second mirrors having image planes which must remain parallel, a first one of said mirrors being in contact with a reference plane defined by said housing, a pair of rigid spacer plates having ends contacting facing image plane sides of said mirrors, said spacer plates being freely moveable with respect to said housing in spaced paths which intersect said image planes of said mirrors, and resilient means engaging a second one of said mirrors without contacting the image plane side thereof to urge said second one of said mirrors toward said spacer plates and toward said first one of said mirrors.

The invention further provides, in a scanner carriage comprising a housing having a cover and containing a plurality of mirrors which provide a folded optical light path for transmitting a scanned image to a lens assembly, the improvement comprising spaced first and second mirrors each having a side edge and having image planes which must remain parallel, each of said mirrors being supported in said housing, a first one of said mirrors being in contact with a reference plane defined by said housing, a pair of rigid spacer plates having ends contacting facing image plane sides of said mirrors proximate spaced ends of said mirrors, said spacer plates being freely moveable with respect to said housing in spaced planes which intersect facing image planes of said mirrors, and compressed resilient means having a first side engaged with said cover and a second side engaged with a side edge of said first mirror and with a respective spacer plate proximate the image plane side of said first mirror.

DESCRIPTION OF THE PREFERRED EMBODIMENT

Figure 1:
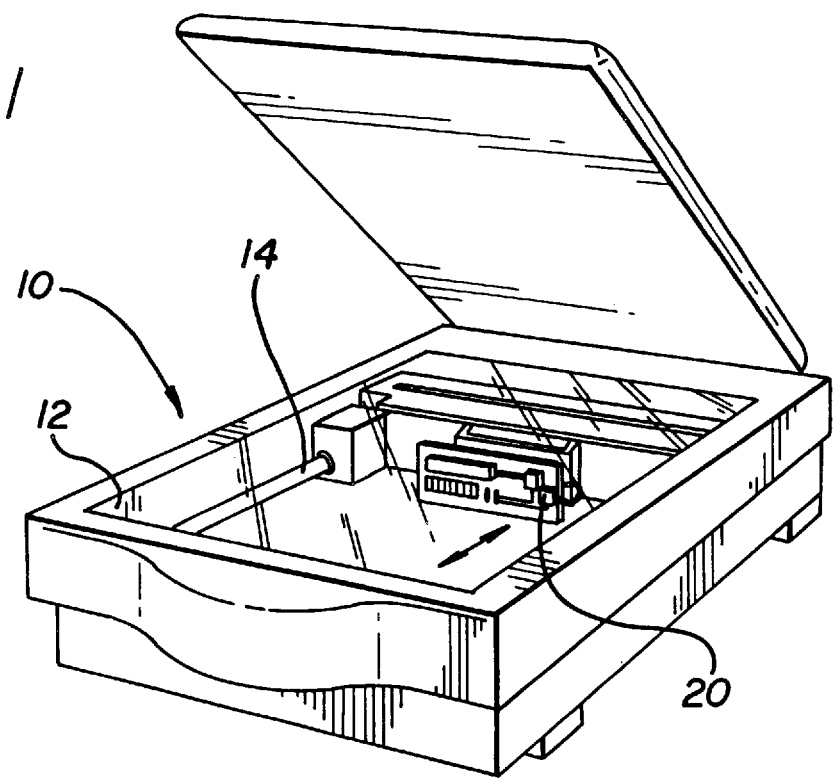
FIG. 1 is perspective view of a document scanner and the carriage therein.

The present invention is concerned with scanners of the type shown in Figure 1 which have a carriage 20 mounted in a scanner 10 below a glass window 12 which receives the document to be scanned. The scanner carriage 20 is mounted on one or more spaced rods 14 or guide tracks for movement in the direction shown.

Figure 2:
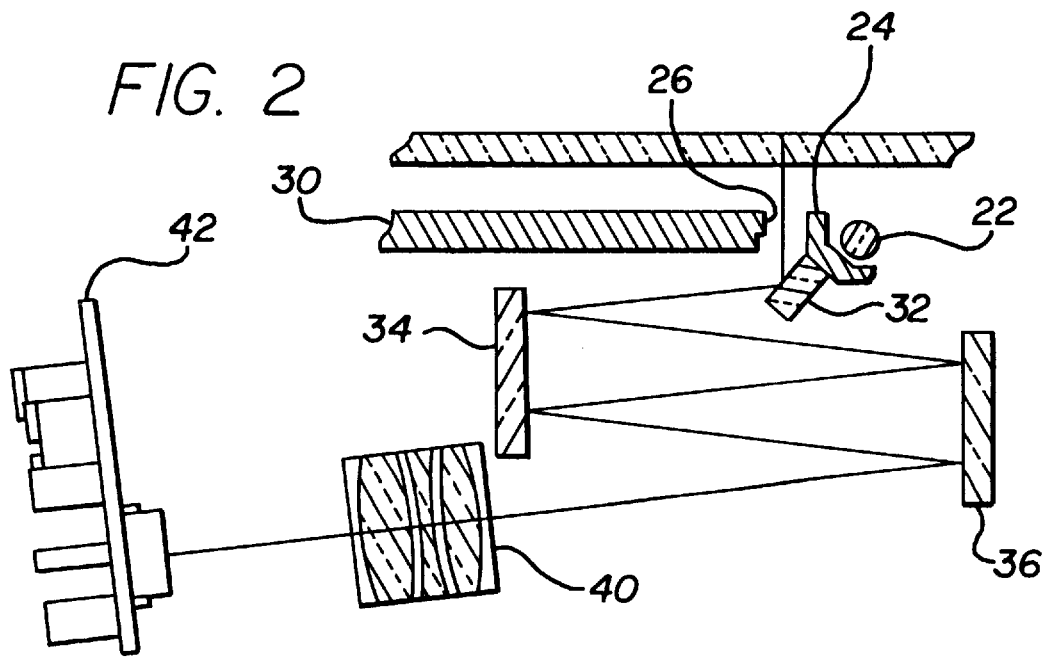
FIG. 2 is a cross sectional elevation view showing a folded optical path defined by the mirrors in the scanner carriage.

As seen in FIG. 2, a lamp 22 and reflector 24 are mounted in the carriage 20 proximate a slot 26 in the carriage cover 30 which receives reflected light and scanned information which is reflected from an angled narrow mirror 32 to an upper wide mirror 34, then to a lower wide mirror 36 in repeated fashion and finally passes through a lens assembly 40 mounted on the carriage to a CCD circuit 42 which electrically processes the scanned information. The scanner carriage 20 generally comprises a molded plastic chassis 50 and cover 30 which is affixed to the chassis 50 by screws 51 to form a housing in which the mirrors are positioned. Angled narrow mirror 32 is directly attached to the housing chassis 50 and held in place by spring clips 35.

Figure 3:
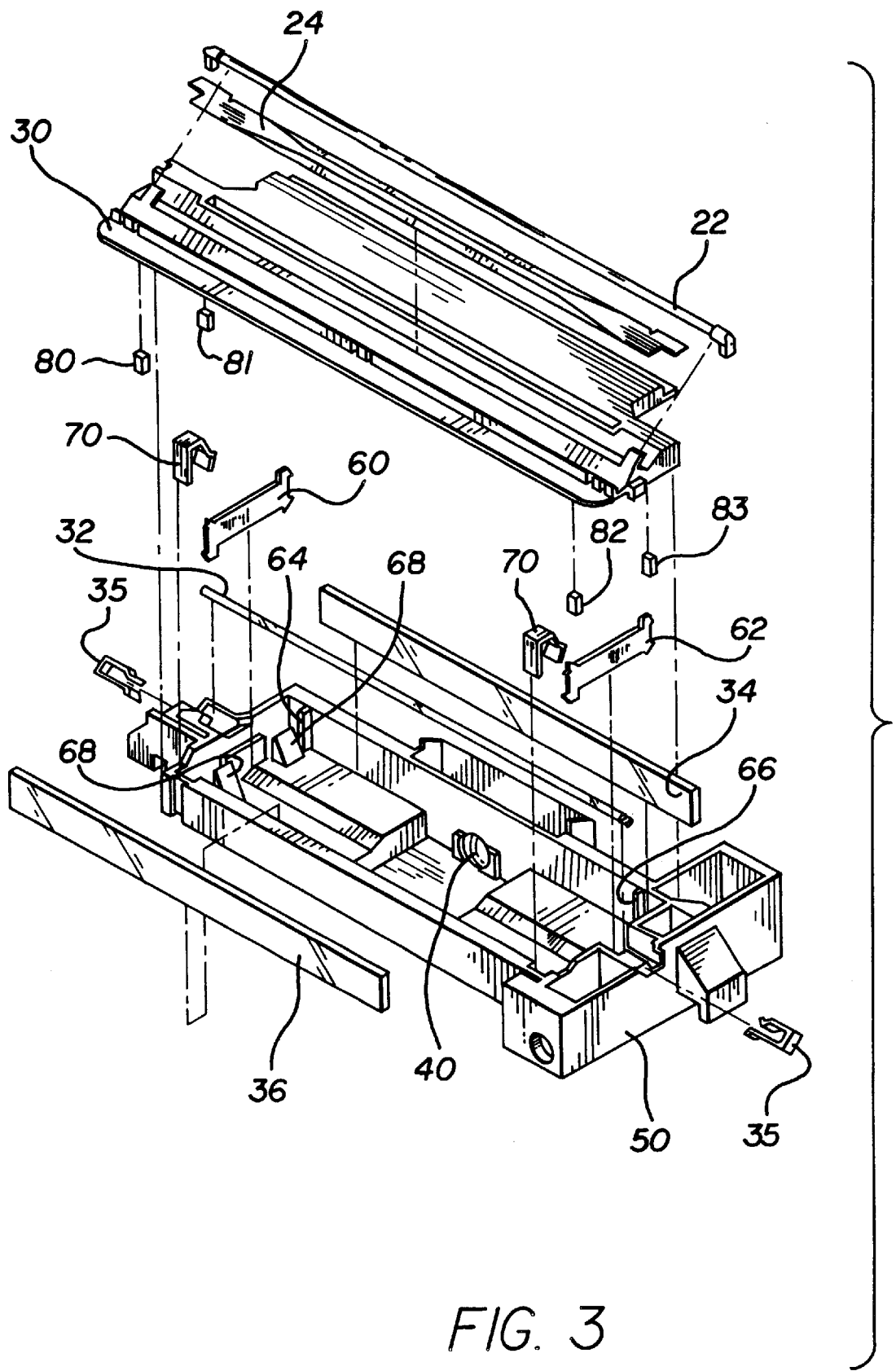
FIG. 3 is an exploded perspective view of the scanner carriage.
Figure 5:
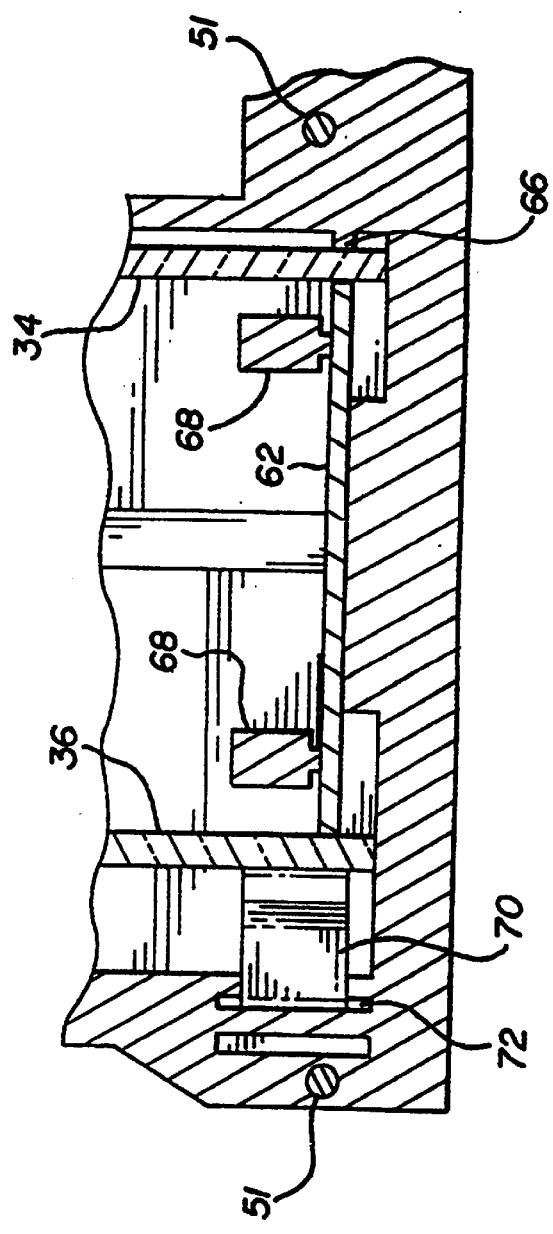
FIG. 5 is a sectional plan view of the carriage.

The upper and lower mirrors 34, 36 are not directly connected to the chassis 50 but are maintained in precise spaced parallel relationship to each other by a pair of spaced flat sheet metal spacer plates 60, 62 oppositely facing the image plane sides of the respective mirrors. As best seen in FIGS. 3 and 5, the upper mirror 34 engages spaced vertically extending rails 64, 66 which are molded on an interior wall of the chassis 50 on opposite sides of the lens assembly 40. Grooves in which the spacer plates are free to float or move in directions normal to the image planes of the upper and lower mirrors are also molded into the housing. As shown in FIGS. 2 and 5 the spacer plate grooves are defined by inside side walls of the chassis 50 and by abutments 68 molded on the floor of the housing.

One of the two parallel mirrors 34, 36 is mounted at a slightly higher elevation in the chassis 50 so that the folded optical path shown in FIG. 2 can be maintained. A pair of spaced identical sheet metal leaf springs 70 are received in slots 72 formed in the chassis 50 and urge the lower mirror 36 to the right as seen in FIG. 4 into engagement with the spacer plates 60, 62 which are likewise urged to the right into firm engagement with the upper mirror 34 which in turn is urged against the rails 64, 66 to maintain the precise position, spacing and parallelism of the mirrors in the chassis as required.

Figure 4:
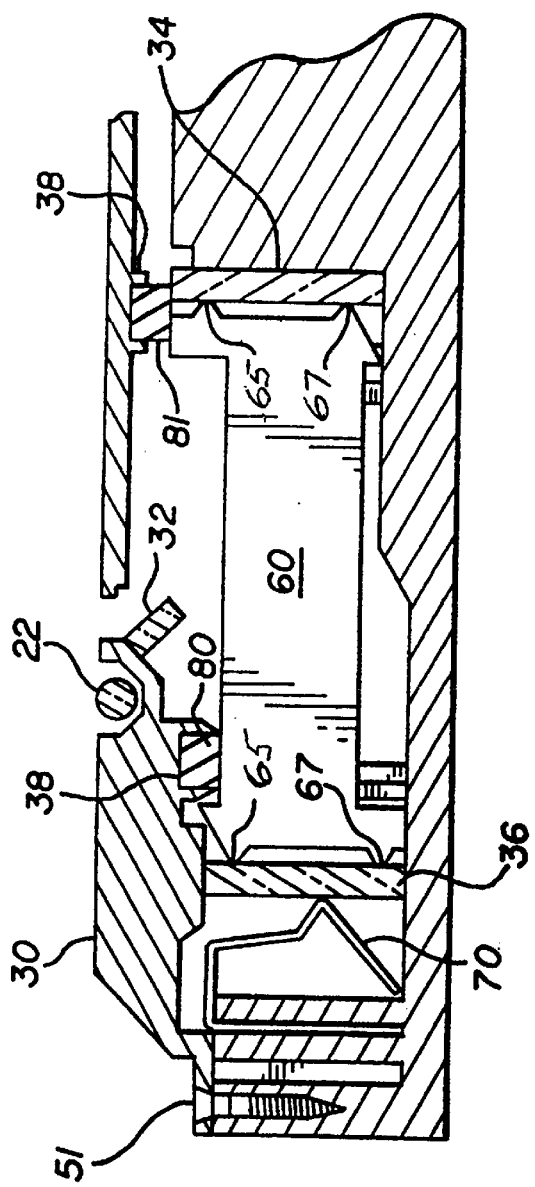
FIG. 4 is a cross sectional elevation of the scanner carriage.

The underside of the housing cover 30 is preferably molded with spaced apertures 38 which receive four elastomeric compressible pads 80, 81, 82, 83 positioned as shown in FIGS. 3 and 4 which, when the cover is screwed onto the chassis 50 to form the housing, are partially compressed and engage an upper edge of the upper mirror 34 and the spacer plates 60, 62 to firmly affix them in the required position without the need of affixation screws or spring clips or the equivalent. First and second elastomeric pads 81, 83 engage both an upper side edge of the upper mirror 34 as well as an upper edge of the respective spacer plates 60, 62 at locations proximate their points of contact with the upper mirror. Third and fourth elastomeric pads 80, 82 engage the upper edges of the spacer plates 60, 62 proximate the points of contact of the spacer plates with the lower mirror 36 but do not engage the lower mirror 36 itself. Preferably, the spacer plates 60, 62 are identical with each other and are formed from flat pieces of sheet metal and have upper and lower projecting fingers 65, 67 at the opposite mirror-engaging edges which contact the upper and lower mirrors on the facing image plane sides thereof.

By virtue of the fact that the spacer plates 60, 62 can be substantially identical sheet metal parts as can the biasing springs 70, 72, economies of manufacture and assembly result. It will also be noted that the spacer plates are freely movable with respect to the chassis 50 in spaced paths which intersect the image planes of the mirrors and that the springs 70 do not contact the image plane sides of the mirrors whereby the image plane sides are substantially unobstructed except for the points of contact with the spacer plates. This enables the scanner carriage to occupy a relatively small footprint and enable use of a larger portion of the mirrors than otherwise possible.

As shown, the spacer plates 60, 62 are free to move in and occupy spaced planes which are normal to the image planes of the mirrors 34, 36; however, other arrangements in which the planes of the spacer plates are not necessarily normal to the image planes of the mirrors and arrangements in which the spacer plates are not parallel to each other are contemplated.

Affixation of the cover 30 to the housing by screws compresses the resilient pads 80–83 into engagement with the upper side edge of the upper mirror 34 and with the spacer plates 60, 62 at the positions shown to maintain the mirrors in precise spaced parallel relationship despite shock or vibration of the device during shipment or use. Although spaced elastomeric pads 81, 83 are shown contacting the upper mirror and spacer plates, a single elastomeric compressible pad which extends substantially the full length of the upper mirror is also contemplated.

Persons skilled in the art will readily appreciate that various modifications can be made from the preferred embodiment of the invention disclosed herein and that the scope of protection is intended to be defined only by the limitations of the appended claims.

We claim:

1. In a scanner carriage comprising a housing containing a plurality of mirrors which provide a folded optical light path for transmitting a scanned image to a lens assembly, the improvement comprising spaced first and second mirrors having image planes which must remain parallel, a first one of said mirrors being in contact with a reference plane defined by said housing, a pair of rigid spacer plates having ends contacting facing image plane sides of said mirrors, said spacer plates being freely moveable with respect to said housing in spaced paths which intersect said image planes of said mirrors, and resilient means engaging a second one of said mirrors without contacting the image plane side thereof to urge said second one of said mirrors toward said spacer plates and toward said first one of said mirrors.

2. The scanner carriage of claim 1, wherein said spaced planes in which said spacer plates are free to move are parallel.

3. The scanner carriage of claim 2, wherein said spaced parallel planes are normal to said image planes of said mirrors.

4. The scanner carriage of claim 3, wherein said mirrors are rectangular and said spacer plates contact said mirrors proximate ends of said mirrors.

5. The scanner carriage of claim 4, further comprising guide channels on said housing for receiving said spacer plates, said guide channels extending parallel to said spacer plates and permitting movement of said spacer plates in said channels.

6. The scanner carriage of claim 5, wherein said reference plane is defined by spaced rails on an interior housing wall.

7. The scanner carriage of claim 6, wherein said housing is a molded housing, said spacer plate guide channels, said spaced rails defining said reference plane, and apertures for holding said resilient means being molded with said housing.

8. The scanner carriage of claim 7, wherein said resilient means comprise at least one bent leaf spring affixed to said housing, said leaf spring engaging a rear side of said second mirror opposite said image plane.

9. The scanner carriage of claim 8, further comprising a second bent leaf spring affixed to said housing, said leaf springs being spaced from each other and each being engaged with said rear side of said second mirror.

10. The scanner carriage of claim 5, wherein said spacer plates are substantially identical planar sheet metal parts.

11. The scanner carriage of claim 10, wherein said mirrors are substantially identical and one of said mirrors is positioned in said housing at an elevation above the elevation of the other mirror.

12. In a scanner carriage comprising a housing having a cover and containing a plurality of mirrors which provide a folded optical light path for transmitting a scanned image to a lens assembly, the improvement comprising spaced first and second mirrors each having a side edge and having image planes which must remain parallel, each of said mirrors being supported in said housing, a first one of said mirrors being in contact with a reference plane defined by said housing, a pair of rigid spacer plates having ends contacting facing image plane sides of said mirrors proximate spaced ends of said mirrors, said spacer plates being freely moveable with respect to said housing in spaced planes which intersect facing image planes of said mirrors, and compressed resilient means having a first side engaged with said cover and a second side engaged with a side edge of said first mirror and with a respective spacer plate proximate the image plane side of said first mirror.

13. The scanner carriage of claim 12 wherein said spaced planes in which said spacer plates are free to move are parallel.

14. The scanner carriage of claim 13, wherein said spaced parallel planes are normal to said image planes of said mirrors.

15. The scanner carriage of claim 14, wherein said resilient means comprise first and second spaced elastomeric pads, each pad being compressed between said cover and a respective spacer plate and a side edge of said first mirror.

16. The scanner carriage of claim 15, further comprising third and fourth elastomeric pads, each of said third and fourth pads being compressed between said cover and a respective spacer plate proximate the contact of said spacer plates with the image plane side of said second mirror.

17. The scanner carriage of claim 16, wherein said cover further comprises spaced molded apertures receiving said elastomeric pads.

18. The scanner carriage of claim 16, further comprising resilient means engaging a second one of said mirrors without contacting the image plane side thereof to urge said second one of said mirrors toward said spacer plates and toward said first one of said mirrors.

19. The scanner carriage of claim 18, further comprising guide channels on said housing for receiving said spacer plates, said guide channels extending parallel to said spacer plates and permitting movement of said spacer plates in said channels.

20. The scanner of claim 19, wherein said resilient means comprise at least one bent leaf spring affixed to said housing, said leaf spring engaging a rear side of said second mirror opposite said image plane.

21. A free floating mirror assembly, comprising:
a chassis having a plurality of horizontal and vertical datum surfaces and at least one pair of alignment slots;
a free floating spacer arrangement supported within said pair of alignment slots for providing a pair of vertical reference planes;
a free floating mirror arrangement supported from below by said plurality of horizontal datum surfaces for providing a pair of spaced apart facing parallel image planes referenced to said pair of vertical reference planes and to said plurality of horizontal datum surfaces; and
a spring arrangement for holding said spacer arrangement and said mirror arrangement in said chassis referenced to said vertical datum surfaces and said horizontal datum surfaces so that said mirror arrangement provides a high tolerance light path between said pair of facing parallel image planes.

22. A free floating mirror assembly according to claim 21, wherein said mirror arrangement includes:
a free floating front mirror supported from below by at least one of the horizontal datum surfaces for providing a front mirror image;

a free floating rear mirror supported from below by at least another one of the horizontal datum surfaces for providing a rear mirror image;
one of the front and rear mirrors having a reverse image face in supporting engagement with a least one of the vertical datum surfaces for aligning the front face image of the mirror in a tight tolerance parallel plane with another front face image of the other mirror.

23. A free floating mirror assembly according to claim 22, wherein said alignment slots include:
a right side mirror alignment slot disposed perpendicularly between said plurality of vertical datum surfaces; and
a left side mirror alignment slot disposed perpendicularly between said plurality of vertical datum surfaces;
said right slot and said left slot being parallel to one another to facilitate high tolerance parallel image plane alignment.

24. A free floating mirror assembly according to claim 23, wherein said free floating spacer arrangement includes:
a free floating right side spacer disposed in said right side mirror alignment slot for spacing a right side of said front mirror and a right side of said rear mirror from one another; and
a free floating left side spacer disposed in said left side mirror alignment slot for spacing a left side of said front mirror and a left side of said rear mirror from one another.

25. A free floating mirror assembly according to claim 24, wherein said spring arrangement includes:
at least one spring disposed between at least another one of the vertical datum surfaces and a reverse image face of the other mirror for holding the facing image planes of said front mirror and said rear mirror in tight tolerance parallel alignment between said right side spacer and said left side spacer referenced to said plurality of horizontal datum surfaces and said plurality of vertical datum surfaces so that said front mirror and said rear mirror providing a high tolerance light path between their facing parallel image planes.

26. A free floating mirror assembly according to claim 25 further comprising:
a plurality of elastomeric alignment pads for helping to hold said spacer arrangement and said mirror arrangement relative to one another in a fixed position without affixing said spacer arrangement and said mirror arrangement to said chassis.

27. A free floating mirror assembly according to claim 26, wherein each individual one of said plurality of elastomeric alignment pads are compressible to facilitate the assembly of said spacer arrangement and said mirror arrangement relative to one another.

28. A free floating mirror assembly according to claim 27 wherein said plurality of elastomeric alignment pads includes four alignment pads, each alignment pad having a mirror pad alignment slot for receiving an edge portion of one of the mirrors and a spacer pad alignment slot for receiving an edge portion of one of the spacers;
said mirror pad alignment slot and said spacer pad alignment slot being perpendicular to one another to facilitate the parallel alignment of the front and rear mirrors relative to one another.

29. A free floating mirror assembly according to claim 28, wherein said chassis is a low tolerance plastic molded chassis.

30. A mirror assembly for providing a high tolerance light path between facing parallel image planes, comprising:

a mirror chassis having a plurality of horizontal datum surfaces and a plurality of vertical datum surfaces for facilitating high tolerance parallel image plane alignment;

said chassis having a right side mirror alignment slot and a left side mirror alignment slot, said right slot and said left slot being parallel to one another for further facilitating high tolerance parallel image plane alignment;

a free floating front mirror disposed perpendicularly to the mirror alignment slots and supported from below by at least one of the horizontal datum surfaces for providing a front mirror image;

a free floating rear mirror disposed perpendicularly to the mirror alignment slots and supported from below by at least another one of the horizontal datum surfaces for providing a rear mirror image;

a free floating right side spacer disposed in said right side mirror alignment slot for spacing a right side of said front mirror and a right side of said rear mirror from one another;

a free floating left side spacer disposed in said left side mirror alignment slot for spacing a left side of said front mirror and a left side of said rear mirror from one another;

one of the front and rear mirrors having a reverse image face in supporting engagement with a least one of the vertical datum surfaces for aligning the front face image of the mirror in a tight tolerance parallel plane with another front face image of the other mirror; and at least one spring disposed between at least another one of the vertical datum surfaces and a reverse image face of the other mirror for holding the facing image planes of said front mirror and said rear mirror in tight tolerance parallel alignment between said right side spacer and said left side spacer referenced to said plurality of horizontal datum surfaces and said plurality of vertical datum surfaces so that said front mirror and said rear mirror providing a high tolerance light path between their facing parallel image planes.

* * * * *